United States Patent [19]

White

[11] Patent Number: 5,134,846

[45] Date of Patent: Aug. 4, 1992

[54] INSULATED EXHAUST COVER

[75] Inventor: James E. White, Middleburg Heights, Ohio

[73] Assignee: Thermo-Tec High Performance Automotive Inc., Middleburg Heights, Ohio

[21] Appl. No.: 440,227

[22] Filed: Nov. 22, 1989

[51] Int. Cl.$^5$ .............................................. F01N 7/14
[52] U.S. Cl. ...................... 60/272; 29/890.08; 60/322; 138/147; 138/149
[58] Field of Search ............... 60/272, 322; 29/890.08; 138/147, 149

[56] References Cited

U.S. PATENT DOCUMENTS

| | | | |
|---|---|---|---|
| 3,233,699 | 2/1966 | Plummer | 60/272 |
| 3,995,665 | 12/1976 | Monaghan | 138/147 |
| 4,345,430 | 8/1982 | Pallo | 138/149 |
| 4,673,002 | 6/1987 | Scanlon | 138/149 |

FOREIGN PATENT DOCUMENTS

| | | | |
|---|---|---|---|
| 2655091 | 6/1978 | Fed. Rep. of Germany | 60/322 |
| 3404771 | 8/1985 | Fed. Rep. of Germany | 60/322 |

*Primary Examiner*—Douglas Hart
*Attorney, Agent, or Firm*—Oldham, Oldham & Wilson Co.

[57] ABSTRACT

A cover for insulating exhaust systems of internal combustion engines comprising a tubular shaped layer of insulating material circumscribingly engaging the exhaust system and a flexible metal sleeve for protecting the insulating material and holding the insulating material against the exhaust system. The present invention is held in place using mechanic's wire or steel tie wraps such as a hose clamp. The present invention can also be varied for use in retrofitting existing exhaust systems. In this manner, the insulating layer and flexible metal sleeve are made of sheet material which can be wrapped around the installed exhaust system without necessitating removal of the system.

25 Claims, 1 Drawing Sheet

INSULATED EXHAUST COVER

TECHNICAL FIELD

The present invention relates, generally, to a cover for insulating exhaust systems of internal combustion engines. More specifically, the present invention relates to a cover comprising a layer of insulating material and a flexible metal sleeve for retaining said insulating material in place.

BACKGROUND

Car enthusiasts and racing professionals are perpetually searching for ways to improve their car's performance. Auto makers are constantly searching for new ways of increasing fuel economy and decreasing auto emissions. Both of these groups have achieved success by insulating the exhaust systems of the internal combustion engine.

Insulating the exhaust system has been shown to increase an engine's performance. This is accomplished by hastening the exit of combusted gasses in the exhaust system and allowing the engine to accept a greater volume of cooler intake air. The applicant's research has shown that every ten degree fahrenheit (10° F.) drop in air intake temperature causes a one percent (1%) increase in horsepower in engines with a carburetor, and a two percent (2%) increase in horsepower with turbo charged engines. The combusted gasses begin to cool as soon as they leave the chamber and, therefore, lose velocity. Thus, insulating the pipes of the exhaust system keeps the gasses at as high a temperature as possible and increases their exit velocity. The increased exit of combusted gasses reduces exhaust or back pressure and allows the engine to accept a greater volume of cooler intake air.

Performance is improved due to a cleaner air-fuel mixture and the increased flow of air-fuel mixture into the combustion chamber. A cleaner air-fuel mixture results in more complete combustion of fuel, thereby increasing fuel efficiency and decreasing fuel consumption and emissions.

Insulated exhaust systems improve the safety of the engine and increase the life of many of its parts. The under-the-hood temperature is decreased by an insulated exhaust system. Such insulation prevents heat escape along the exhaust system. This reduction in temperature will extend the life of electrical and electronic engine components, especially starters. Insulated exhaust systems allow for a cooler cab or cockpit temperature as well as reducing the incidence of burns to mechanics during maintenance. Insulated exhaust systems have fewer header fires and the system itself lasts longer because less corrosion-causing condensation of sulfur, nitrogen oxide, and other compounds occurs.

Many methods of insulating exhaust systems have been used. Heat shields are employed in engines, not to insulate the exhaust system, but to protect other engine parts adversely effected by extreme heat. Ceramic spray coating of the system is well known in the art, but it is expensive to apply and is not as effective as the present invention. Other types of ceramic-containing products, such as high silica ceramic fiber, have been tried but are expensive and not durable.

A number of insulating wraps and tapes are well-known in the art, and while these can be effective, they are often hard to apply and they often unravel or wear over time. Furthermore, these wraps do not possess the insulating properties of the present invention.

SUMMARY

The present invention, generally stated, is an apparatus and a method of insulating the exhaust systems of internal combustion engines. More specifically, the invention is an insulating material, often a glass fiber composition, which is formed into a tube. This tube of insulating material is sized and cut to fit over the various pipes of the exhaust system to maintain the heat within the exhaust pipe. A flexible metal sleeve is sized and cut to fit over the exhaust pipe and the insulating material. This sleeve holds the insulating material in contact with the exhaust pipe and serves to protect the insulating material. Both layers are held onto the exhaust pipe using mechanic's wire, steel tie wraps or hose clamps.

The present invention for insulating exhaust systems is more effective, less expensive and more easily installed than any known in the prior art.

It is an object of the present invention to provide an apparatus for insulating the exhaust system of internal combustion engines which can increase the engine's performance.

It is also an object of the present invention to provide an apparatus for insulating the exhaust system of internal combustion engines which results in more complete combustion of fuel, thereby increasing fuel efficiency and decreasing fuel consumption and emissions.

It is a further object of the present invention to provide an apparatus for insulating the exhaust system of internal combustion engines which substantially reduces under-the-hood temperatures.

It is a further object of the present invention to provide an apparatus for insulating the exhaust system of internal combustion engines which extends the life of electrical and electronic engine components.

It is a further object of the present invention to provide an apparatus for insulating the exhaust system of internal combustion engines which increases safety during maintenance as well as during performance.

It is a further object of the present invention to provide an apparatus for insulating the exhaust system of internal combustion engines which is a more effective insulator than the prior art.

It is a further object of the present invention to provide an apparatus for insulating the exhaust system of internal combustion engines which is a relatively inexpensive insulator.

It is a further object of the present invention to provide an apparatus for insulating the exhaust system of internal combustion engines which can be retrofitted onto existing engines.

These and other objects and advantages will become more readily apparent from the detailed description taken in conjunction with the drawings.

Such objects and advantages are achieved by a device for insulating one or more pipes in the exhaust system of an internal combustion engine comprising a layer of insulating material circumscribingly engaging the outer surface of said exhaust pipes, a flexible metal sleeve surrounding said layer of insulating material to retain said insulating material in close proximity to said exhaust pipe, a means for retaining said insulating material and said metal sleeve in stationary and approximate contact around said exhaust pipe.

DETAILED DESCRIPTION OF THE PREFERRED EMBODIMENT

Figure 1:
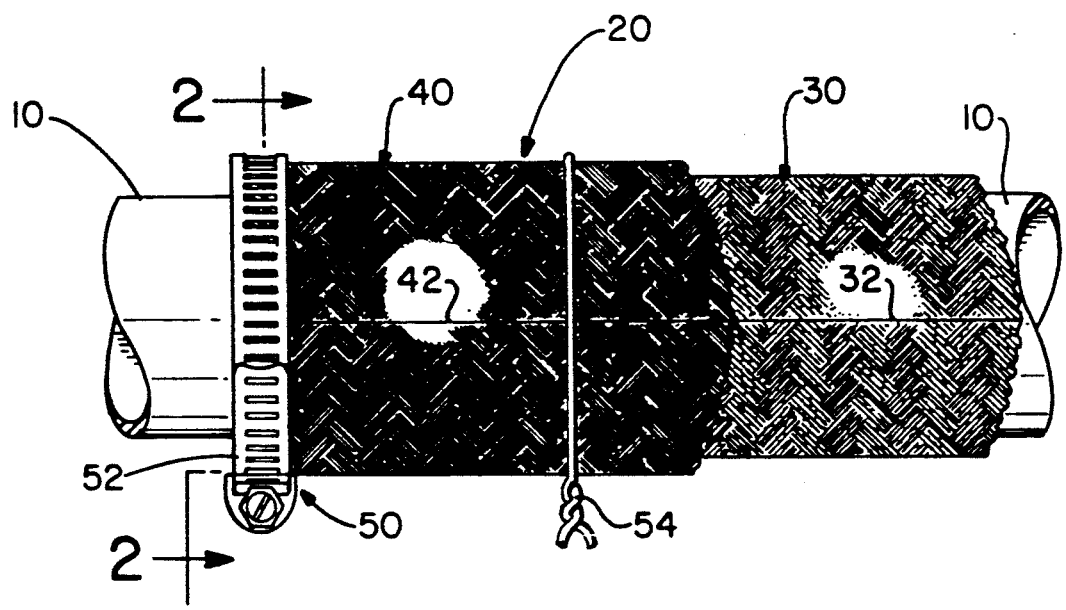
FIG. 1 is an elevational plan view of an apparatus for insulating the exhaust system of an internal combustion engine with portions of each layer cut away for purposes of illustration.

Now, with reference to the drawings, FIG. 1 illustrates a length of pipe 10 from an exhaust system of an internal combustion engine with the present invention installed thereon.

The present invention is a cover, shown generally as 20, for insulating the various parts of the exhaust system for an internal combustion engine. The present embodiment contemplates a cover comprising two layers, an insulating layer 30 and a flexible metal cover sleeve 40. These layers are held onto the various parts of the exhaust system using mechanic's wire 54, steel tie wraps or standard hose clamps 52.

The first layer of the cover is an insulating layer 30. The preferred embodiment contemplates insulating layer 30 as being composed of a glass fiber containing material capable of withstanding temperatures in excess of 1100° F. One such material is a glass fiber containing material sold under the trademark "ZETEX" and manufactured by New Tex Industries, In. Another such material is a glass fiber containing material treated with vermiculite (according to U.S. Pat. No. 4,608,303) sold under the trademark "ZETEX PLUS" and also manufactured by New Tex Industries, Inc. This product has insulating capabilities which enable it to withstand temperatures up to approximately 2000° F. Other materials such as high silica ceramic textiles may be used but are considerably more expensive than the material used in the present embodiment.

The insulating layer 30 may be supplied in rolls of material which may be cut and wrapped around the outside of the exhaust pipes 10. However, the preferred embodiment contemplates such insulating layers 30 as forming a tube with a diameter slightly larger than the corresponding exhaust pipe 10. The tube of insulating material is cut to the desired length and slid over the length of the exhaust pipe 10 to be insulated. The insulating layer 30 may be made of non-woven cloth, but a non-woven material has limited flexibility and causes wrinkling when slid around bends in the pipe. Woven material is preferred. Material in a braided or woven form provides the greatest flexibility for covering exhaust pipes having a series of bends. "However, materials made of various types of carbon fiber known or currently being developed are also contemplated."

The cover sleeve 40, generally serves to hold the insulating layer 30 in place against the exhaust pipe 10. Said sleeve 40 further serves to protect the insulating layer 30 from damage. The cover sleeve 40 may be composed of any flexible, but durable material known in the art. Stainless steel seems to be particularly well suited for this purpose because of its strength and corrosion resistent properties.

The cover sleeve 40 is contemplated as comprising a flexible metal tube of a diameter slightly larger than the diameter of said insulating layer and exhaust pipe. This flexible metal tube is contemplated as any wire mesh, wire cloth or braided metal material known in the art.

A preferred cover sleeve 40 comprises a flexible wire mesh made from numerous strands of stainless steel wire woven in a braided manner. More specifically, numerous strands of wire are grouped in bundles. These bundles are woven together in a crosswise pattern wherein one bundle is woven over two bundles and under the next two bundles in repeating pattern. This is a common type of basket weave and often referred to as a double dutch weave. In such a weave both the woof and the warp fibers or fiber bundles run diagonal to the longitudinal axis of the material and opposite one another. This form of wire mesh is well known in the art and available from a variety of manufacturers. A preferred embodiment of the present invention also contemplates an insulating layer 30 woven in the same manner as a preferred cover sleeve 40 described above.

A length of wire mesh tubing to be used for cover sleeve 40 is cut to the desired length and slidably placed over the insulating layer 30 and exhaust pipe 10. Both the insulating layer 30 and the cover sleeve 40 are held to the exhaust pipe by a retaining means 50. Several preferred retaining means, generally 50, include mechanic's wire 54, or steel tie wraps 52, although other means of retaining the apparatus on the exhaust pipes commonly known in the art are contemplated. A commonly used type of steel tie wrap 52 is a standard hose clamp. These retaining means are illustrated in FIG. 1.

Figure 2:
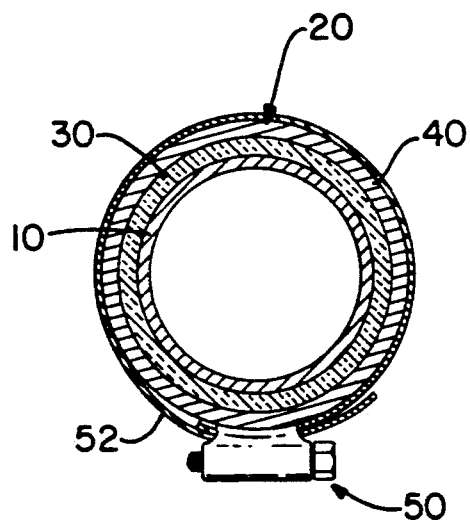
FIG. 2 is a transverse cross-sectional view on line 2—2 of FIG. 1 of an apparatus for insulating the exhaust system of an internal combustion engine.

FIG. 2 illustrates the present invention in a cross sectional view along lines 2—2 of FIG. 1. This figure shows the orientation of the various components of the cover 20 to the exhaust pipe 10. Pipe 10 is shown as having a circular cross-section, but pipe having other cross-sections could also be fitted using the present invention.

The present invention can be sold as a two piece system wherein correct lengths of the insulating layer 30 and the cover sleeve 40 are individually cut and fit to the particular exhaust. However, for fitting standard exhaust systems, the product may be sold as a one piece system where the insulating layer has been placed inside the cover sleeve at the time of manufacture.

It is contemplated that the present invention may be installed at the time of the exhaust system's assembly. Additionally, it is contemplated that the present invention will be available for retrofitting older exhaust systems.

The woven pattern of both the insulating layer 30 and the cover sleeve 40 of the preferred embodiment is especially advantageous when fitting the present invention to the exhaust system. By compressing the ends of each layer towards the middle, the fibers are loosened and the circumference of the opening is increased, thereby aiding in sliding the present invention onto the exhaust. After covering the exhaust pipe, but prior to affixing one or more retaining means, the layer(s) are stretched from end to end to ensure a snug fit onto the exhaust pipe.

It is contemplated that the present invention will be manufactured and supplied with a number of different opening diameters for accommodating the various diameters of exhaust systems.

Another preferred embodiment discloses the present invention with one lengthwise cut from end to end in each layer. Such a cut would enable the present invention to be wrapped around a length of exhaust pipe on an assembled system as opposed to removing the length of pipe in order to install the present invention. This embodiment would be retained on the exhaust pipe in the same manner as previously described.

The present invention is contemplated for use generally, as an insulating cover for any exhaust system used with internal combustion engines. The invention is adaptable for use with turbines, diesel, aircraft, and high performance engines, etc., as well as for use with standard automobile and truck exhaust systems.

While in accordance with the patent statutes the best mode and preferred embodiment of the invention has been described, it is to be understood that the invention is not limited thereto, 'ut rather is to be measured by the scope and spirit of the appended claims.

What is claimed is:

1. A device for insulating one or more pipes in the exhaust system of an internal combustion engine comprising:
    a layer of insulating material circumscribingly engaging the outer surface of said exhaust pipe,
    a flexible metal sleeve defining an elongated passageway having a diameter, said diameter being enlarged by imposing a lengthwise compressive force upon said sleeve and decreased by imposing a lengthwise outward force on said sleeve, said sleeve surrounding said layer of insulating material to retain said insulating material in approximate contact with said exhaust pipe, and
    a means for retaining said insulating material and said metal sleeve in stationary and approximate contact around said exhaust pipe.

2. The device as recited in claim 1 wherein the insulating material is formed in a tubular shape diametered slightly greater than said pipe of said exhaust system.

3. The device as recited in claim 2 wherein the insulating material comprises a woven tube, the warp and the woof weaves of said woven tube are each aligned diagonally relative to the longitudinal axis of said tube.

4. The device as recited in claim 3 wherein the warp and the woof weaves of said woven tube are woven together in a crosswise pattern, each weave crossing in a repeating sequence of over two opposite weaves and under two opposite weaves.

5. The device as recited in claim 1 wherein the insulating material is a flexible sheet material and of sufficient dimension so as to circumscribingly engage at least a substantial circumference of the outer surface of said exhaust pipe.

6. The device as recited in claim 1 wherein the insulating material further comprises fiberglass.

7. The device as recited in claim 6 wherein the insulating material is "ZETEX TM ".

8. The device as recited in claim 6 wherein the insulating material is "ZETEX PLUS TM ".

9. The device as recited in claim 1 wherein the insulating material further comprises ceramic fiber.

10. The device as recited in claim 1 wherein the metal sleeve further comprises a plurality of woven metal strands.

11. The device as recited in claim 1 wherein the metal sleeve further comprises a plurality of bundles of metal strands interwoven in a crosswise pattern.

12. The device as recited in claim 1 wherein the metal sleeve is made of stainless steel.

13. The device as recited in claim 1 wherein the flexible metal sleeve is formed in a tubular shape diametered slightly greater than said pipe and said insulating layer.

14. The device as recited in claim 13 wherein the flexible metal sleeve comprises a woven tube, the warp and woof weaves of said woven tube are each aligned diagonally relative to the longitudinal axis of said tube.

15. The device as recited in claim 14 wherein the warp and the woof weaves of said woven metal tube are woven together in a crosswise pattern, each weave crossing in a repeating sequence of over two opposite weaves and under two opposite weaves.

16. The device as recited in claim 1 wherein the means for retaining said insulating material and said metal sleeve is a metal tie wrap.

17. The device as recited in claim 1 wherein the means for retaining said insulating material and said metal sleeve is mechanic's wire.

18. The device as recited in claim 1 wherein the retaining said insulating material and said metal sleeve is a hose clamp.

19. The device as recited in claim 1 wherein said insulating material comprises carbon fiber.

20. The device as recited in claim 1 wherein said device is capable of withstanding temperatures radiating from said exhaust pipe up to approximately 1100° F.

21. The device as recited in claim 20 wherein said device is capable of withstanding temperatures radiating from said exhaust pipe up to approximately 2000° F.

22. The device as recited in claim 1 wherein said insulating material comprises an elongated tube having a diameter, said diameter being enlarged by imposing a lengthwise compressive force upon said tube and decreased by imposing a lengthwise outward force on said tube.

23. A device for insulating one or more pipes of an internal combustion engine comprising:
    a layer of insulating material circumscribingly engaging the outer surface of said exhaust pipe, said insulating material comprises a woven tube, the warp and the woof weaves of said woven weaves are each aligned diagonally relative to the longitudinal axis of said tube, and each weave crossing in a repeating sequence of over two opposite weaves and under two opposite weaves,
    a flexible metal sleeve surrounding said layer of insulating material to retain said insulating material in approximate contact with said pipe,
    a means for retaining said insulating material and said metal sleeve in stationary and approximate contact around said pipe.

24. A method of applying an apparatus for insulating one or more pipes of an exhaust system of an internal combustion engine comprising:
    slidingly engaging a tubular insulating material over the outer surface of said pipe,
    slidingly engaging a metal sleeve over said insulating material,
    affixing said insulating material and said metal sleeve to said pipe using a retaining means.

25. A method of applying a device for insulating one or more pipes of an exhaust system of an internal combustion engine comprising:
    slidably inserting a tubular insulating material inside of a flexible metal sleeve to form an insulating cover,
    slidably inserting said exhaust pipe inside of both said metal sleeve and said insulating material;
    affixing said insulating material and said metal sleeve to said pipe using a retaining means.

* * * * *